2,798,824
Patented July 9, 1957

2,798,824
COATED ELECTRODE PARTICULARLY SUITED FOR WELDING DISSIMILAR METALS

Pierre E. Le Grand, Plainfield, George R. Pease, Westfield, and Theodore E. Kihlgren, Berkeley Heights, N. J., assignors to The International Nickel Company, Inc., New York, N. Y., a corporation of Delaware No Drawing. Application April 11, 1956,
Serial No. 577,437

20 Claims. (Cl. 117—206)

The present invention relates to a welding electrode and more particularly to a welding electrode adapted for depositing strong, ductile, crack-free weld metal upon metals of substantially different composition from the fusion weld deposit.

Heretofore, the art has endeavored to eliminate the necessity for using particular welding electrodes to weld particular combinations of metals and to provide a relatively all-purpose electrode for welding a wide variety of dissimilar metal pairs or for joining members of dissimilar metals in various positions. For example, the art has sought a single welding electrode capable of making crack-free and corrosion resistant overlays on or welds of alloys such as plates of 18–8 stainless steel, special ferritic types of steels and various other iron alloys and nickel alloys. However, these attempts have met with unsatisfactory results. Welding electrodes having austenitic steel cores were prone to produce welds subject to various disadvantages, such as weld cracking, weakness at the joints of metals of substantially different composition, sigma phase formation and carbide precipitation at or around the fusion weld deposits. Some proposed electrodes having cores high in nickel content were not satisfactory for the production of welds where high iron dilution was encountered in the weld. In other instances, the welding electrodes were found to have flux coatings which were friable and/or were subject to mechanical deterioration when baked onto the electrode. The art has particularly sought an electrode having a durable flux coating and suited metallurgically for joining dissimilar metals with tolerance for dilution by high nickel alloys and by high iron alloys. Although many attempts were made to overcome the foregoing difficulties and other disadvantages none, so far as we are aware, was entirely successful when carried into practice commercially on an industrial scale in providing a weld rod or welding electrode suitable for welding a variety of dissimilar metals.

We have discovered an improved welding electrode with a durable flux coating and particularly adapted for satisfactorily welding a variety of dissimilar metals and having a good tolerance for dilution by high-nickel and by high-iron alloys in producing strong, ductile, crack-free welds and overlays.

It is an object of the present invention to provide a multi-purpose welding electrode capable of producing sound welds devoid of gas porosity.

Another object of the invention is to provide an arc welding electrode adapted for operation with direct current.

The invention also contemplates providing a new multi-purpose electrode capable of effecting sound, crack-free welds between a large number of metals and alloys of highly varied composition.

It is a still further object of the invention to provide an electrode which will supplant many of the electrodes now required in a typical plant inventory, diminishing the number of types of electrodes generally required in the usual commercial welding plant inventory.

Among the further objects of the present invention is the provision of an electrode which will consistently give high quality welds.

Other objects and advantages will become apparent from the following description, wherein a number of embodiments of the present electrode are described.

Broadly stated, the present invention contemplates the provision of a flux-coated welding rod having a core wire of a nickel-base alloy and in combination therewith a special flux coating containing controlled amounts of calcium carbonate ($CaCO_3$), cryolite ($Na_3AlF_6$) and calcium silicate ($CaSiO_3$). An important feature of the present invention is that the coated welding rod contains controlled amounts of columbium, molybdenum and manganese in a special balance with the other constituents of the coated welding rod together with a special control of aluminum in the core wire to produce an arc welding electrode having good arc behavior, slagging characteristics and resistance to weld hot cracking. In general, the columbium, molybdenum and manganese each may be present partly in the flux and partly in the core or may be present entirely in the core or in the flux. The columbium may be replaced in part by tantalum. Most commercial sources of columbium usually contain tantalum.

The dry flux of the coating contemplated by the present invention contains the following essential ingredients in the amounts set forth (in percentage by weight of dry flux):

Table I

| Ingredient | Broad Range, percent | Preferred Range, percent |
|---|---|---|
| Calcium Carbonate | 30 to 50 | 35 to 45 |
| Cryolite | 15 to 35 | 20 to 30 |
| Calcium Silicate | 5 to 15 | 6 to 10 |

The dry flux of the coating also desirably can contain the following ingredients:

Table II

| Ingredients | Percentages by Weight of Dry Flux | |
|---|---|---|
| | Broad Range | Preferred Range |
| Lithium Carbonate | up to about 1 | about 0.2 to 1. |
| Molybdenum | up to about 15 | about 2 to 6. |
| Manganese | up to about 13 | about 4 to 8. |
| Columbium [1] | up to about 12 | about 2 to 6. |
| Chromium Oxide | up to about 8 | about 3 to 8. |
| Bentonite | up to about 5 | about 2 to 5. |

[1] Columbium may be replaced in part by tantalum.

The molybdenum, manganese and columbium (with or without tantalum) may be incorporated in the flux composition in any suitable form. Preferably the manganese is added as ferro-manganese, for example, as the grade containing about 85% manganese or about 60% manganese. However, other ferro-manganese alloys may be used. The columbium (with or without tantalum) may conveniently be introduced in the electrode as an alloy, for example, as ferro-columbium or ferro-columbium-tantalum, such as the grades containing about 50% of columbium (with or without some tantalum). The molybdenum may also be introduced as an alloy, for example, as ferro-molybdenum containing about 60% molybdenum. It is preferred to include lithium carbonate in the flux coating because it greatly facilitates the ease of slag removal. Bentonite or similar colloidal clays are preferably included in the welding electrode because the presence of such colloidal clays greatly improves the extrudability of the flux. The present invention contemplates the use of a coloring material in the flux for the purpose of easy identification and selection. For example, chromium oxide can be provided up to 8% by weight of the flux for just such a purpose among various other purposes without any detrimental effect upon desirable electrode characteristics.

A silicate type binder is used with the flux composition to provide a durable and hard coating after drying and baking. This silicate type binder may be a solution of sodium silicate and/or potassium silicate. Other types of binders have been found to be unsatisfactory in this electrode. For example, a dextrine binder, as used in some prior art electrodes, results in a coating that is not hard and durable especially when the electrode is baked at a temperature sufficiently high to insure that the welds will be radiographically sound.

A suitable binder contains about 10% to 20% (by weight of the dry flux) of an aqueous solution of sodium silicate of about 42° Baumé and about 1.5% to 3% (by weight of the dry flux) of invert sugar solution containing about 82% of solids in water, i. e., a water solution of about 43° Baumé.

In preparing the flux coating from the foregoing dry ingredients and binder, the binder is added to the mixture of dry ingredients, together with additional water as needed to obtain a consistency suitable for extrusion on the core wire. It is preferred to use a proprietary invert sugar solution known as "Mordex" in the binder. However, other types of invert sugar solutions may be used. Furthermore, sodium silicate solutions and invert sugar solutions of different specific gravity from those specified in the foregoing binder also may be used. The flux coating can be applied to the core wire in any suitable manner, e. g., by an extrusion process and dried on the wire surface by suitable drying and/or baking. This results in a hard adherent coating of high mechanical strength relatively free from impairment under normal handling conditions. A satisfactory drying or baking treatment of the flux and binder mixture comprises raising the temperature gradually up to about 600° F. and holding at that temperature for about 2 hours.

The core of the electrode contemplated by the invention is a nickel-base alloy having the following basic composition:

*Table III*

| Element | Broad Range | Preferred Range |
|---|---|---|
| Chromium | about 10% to 25% | about 14% to 17%. |
| Iron | 0% to about 20% | from about 5% to 10%. |
| Nickel | at least about 50% | at least about 70%. |

The electrode core of Table III also desirably can contain the following elements:

*Table IV*

| Element | Broad Range | Preferred Range |
|---|---|---|
| Columbium | up to about 4% | about 1.5% to 3%. |
| Molybdenum | up to about 5% | 0 to about 3%. |
| Manganese | up to about 4% | about 0.25% to 3%. |
| Titanium | up to about 0.5% | about 0.1% to 0.35%. |
| Aluminum | up to about 0.12% | 0 to about 0.08%. |
| Magnesium | up to about 0.08% | about 0.02% to 0.05%. |
| Silicon | up to about 0.75% | 0 to about 0.25%. |
| Carbon | up to about 0.15% | 0 to about 0.1%. |

The molybdenum, manganese and columbium (with or without tantalum) may be incorporated in the electrode core in any suitable form as was explained hereinbefore with respect to their incorporation in the flux composition.

The core and flux coating may conveniently be proportioned so that the flux coating constitutes about 15% to about 25% by weight of the coated electrode.

As noted hereinbefore, it is essential that the coated electrode contain a special balance of columbium (with or without tantalum), molybdenum and manganese.

Each of these three elements is incorporated in the core or in the coating or in both, as desired, provided that each is within the ranges shown hereinafter. The columbium (with or without tantalum) should constitute about 1.5% to 5% by weight of the coated electrode, the molybdenum should constitute about 0.5% to 7% by weight of the coated electrode, and the manganese should constitute about 0.75% to 4% by weight of the coated electrode. When one or more of the columbium (with or without tantalum) or the molybdenum or the manganese are incorporated wholly in the flux, they are present in the following percentages by weight of the dry flux:

Columbium (with or without tantalum) about 7.5% to 12%
Molybdenum about 2.8% to 15%
Manganese about 5% to 13%

When one or more of thees elements are present wholly in the core, they are present in the following percentages by weight of the core alloy:

Columbium (with or without tantalum) about 2% to 4%
Molybdenum about 0.5% to 5%
Manganese about 1% to 4%

Manganese is an essential element in the electrode in combination with molybdenum. This special combination assists in the prevention of hot cracking which is ordinarily experienced when a weld becomes diluted with iron.

The following combinations of core wire diameters and electrode outside diameters (coating outside diameters) have been found suitable.

*Table V*

| Core Wire, diameter | Coated Electrode, O. D. |
|---|---|
| 0.078 inch | about 0.110 to 0.130 inch. |
| 0.093 inch | about 0.130 to 0.150 inch. |
| 0.125 inch | about 0.180 to 0.210 inch. |
| 0.156 inch | about 0.200 to 0.240 inch. |
| 0.187 inch | about 0.240 to 0.280 inch. |
| 0.250 inch | about 0.300 to 0.340 inch. |

Satisfactory electrodes embodying the invention have the following composition:

*Table VI*

CORE WIRE

| Element | Electrode A, Percent | Electrode B, Percent | Electrode C, Percent |
|---|---|---|---|
| Chromium | 15 | 16 | 16 |
| Iron | 8 | 7.5 | 8 |
| Manganese | 0.25 | 1.04 | 1.2 |
| Silicon | 0.2 | 0.43 | 0.38 |
| Carbon | 0.05 | 0.05 | 0.05 |
| Titanium | 0.2 | 0.01 | nil |
| Aluminum | 0.05 | <0.01 | 0.013 |
| Magnesium | 0.03 | 0.036 | 0.03 |
| Columbium (plus tantalum) | 2 | 2.2 | 2 |
| Molybdenum | 0 | 1.56 | 1.8 |
| Nickel | [1] Balance | [1] Balance | [1] Balance |

[1] Including small amounts of impurities and incidental elements.

*Table VII*

FLUX COATING

| Ingredient | Electrode A, Percent | Electrode B, Percent | Electrode C, Percent |
|---|---|---|---|
| Calcium Carbonate | 38 | 41.25 | 41.25 |
| Cryolite | 23 | 24 | 24 |
| Calcium Silicate | 8 | 9 | 9 |
| Ferro-Manganese (85%) | 9 | 9 | 9 |
| Ferro-Molybdenum (60%) | 5.25 | 0 | 0 |
| Ferro-Columbium (50%) | 9 | 9 | 9 |
| Lithium Carbonate | 0.5 | 0.5 | 0.5 |
| Bentonite | 3 | 3 | 3 |
| Chromium Oxide | 4.25 | 4.25 | 4.25 |

Table VIII
BINDER FOR ELECTRODES A, B AND C

| Ingredient | Preferred Example, Percent [1] |
|---|---|
| Sodium Silicate Solution (42° Baumé) | 15 |
| Invert Sugar Solution (43° Baumé) (preferably "Mordex") | 2.5 |

[1] By weight of dry flux.

Table IX
COATING THICKNESS FOR ELECTRODES A, B AND C

| Core Diameter, inches | Coating Outside Diameter, inches |
|---|---|
| 0.075 | 0.12 |
| 3/32 | 0.14 |
| 1/8 | 0.19 |
| 5/32 | 0.22 |
| 3/16 | 0.26 |

Using the core wires of Table VI with the respective flux coatings of Table VII, the all-weld metal deposit can be expected to have approximately the following composition:

Table X
TYPICAL ALL-WELD METAL COMPOSITION

| Element | Percentage |
|---|---|
| Chromium | 14 |
| Iron | 8 |
| Molybdenum | 0.75 |
| Columbium (+Ta) | 2 |
| Manganese | 1.5 |
| Silicon | 0.3 |
| Carbon | 0.05 |
| Titanium | 0.02 |
| Magnesium | <0.01 |
| Aluminum | 0.02 |
| Nickel | [1] Balance |

[1] Including small amounts of impurities and incidental elements.

Electrodes having various combinations of alloy core wires and coatings can be used in the production of the improved electrode contemplated by the invention. Thus, for example, with a core wire containing about 2% columbium, about 2% molybdenum and about 1% manganese, there can be omitted part or all of any columbium, molybdenum and manganese in the coating. Specific examples showing nominal core wire compositions embodying this invention are given in the table bearing the title "Core Wire."

For the purpose of giving those skilled in the art a better understanding of the invention and/or a better appreciation of the advantages of the invention, the following illustrative examples are given showing the applicability of the present electrode for joining dissimilar metals:

EXAMPLES

A number of tests were conducted to illustrate the applicability of the electrodes provided by the present invention in the joining of dissimilar metals. The electrodes used in carrying out the welding steps comprised core wires of the compositions similar to electrode "A" of Table VI shown in the schedule entitled "Core Wire" set forth hereinbefore and having a flux coating of the composition similar to electrode "A" of Table VII shown in the corresponding column of the schedule entitled "Flux Coating" also set forth hereinbefore. Butt-welded joints were made 10 inches long using 3/8 inch thick plates which were 5 inches wide and which had the composition of the dissimilar metals shown in Table XI. The plates were welded with a 5/32 inch diameter electrode using a current of about 125 amperes. The longitudinal bend test was made according to Section IX, A. S. M. E. Boiler and Pressure Vessel Code, 1953 edition, paragraph Q–N–7. The joint efficiency test is the ratio of weld strength to strength of the weaker of the two base materials joined by the weld. A joint efficiency of 100% therefore means that the joint broke outside of the weld. Radiographic examination as well as joint efficiency tests and bend tests established that the welds were satisfactory and gave the highly favorable results shown in Table XI when the electrode contemplated by the invention was employed to weld the dissimilar metals indicated in Table XI.

Table XI

| Weld No. | Plate Materials | Radiographic Quality | Longitudinal Bend Test (Percent Elongation in 1/2") | Joint Efficiency (Percent) |
|---|---|---|---|---|
| 1 | Mild Steel and 304 S. S. | Good | 38 N. F. | 100 |
| 2 | Mild Steel and 405 S. S. | do | 42 | 100 |
| 3 | Alloy A and 347 S. S. | do | 41 N. F. | 100 |
| 4 | Mild Steel and 330 S. S. | do | 35 N. F. | 100 |
| 5 | 405 S. S. and 316 S. S. | do | 38 N. F. | 100 |
| 6 | Mild Steel and 316 S. S. | do | 37 N. F. | 100 |
| 7 | Mild Steel and 310 S. S. | do | 34 N. F. | 100 |
| 8 | 304 S. S. and 410 S. S. | do | 35 N. F. | 100 |
| 9 | Mild Steel and 347 S. S. | do | 38 N. F. | 100 |
| 10 | Alloy A and 304 S. S. | do | 34 N. F. | 100 |
| 11 | 405 S. S. and 304 S. S. | do | 33 N. F. | 100 |
| 12 | 405 S. S. and 310 S. S. | do | 34 N. F. | 100 |
| 13 | 405 S. S. and 347 S. S. | do | 34 N. F. | 100 |
| 14 | 405 S. S. and 330 S. S. | do | 34 N. F. | 100 |
| 15 | Mild Steel and Alloy A | do | 31 N. F. | 100 |
| 16 | Mild Steel and 410 S. S. | do | 38 | 100 |
| 17 | Alloy B and 316 S. S. | do | 39 N. F. | 100 |
| 18 | Alloy C and 410 S. S. | do | 38 | 100 |
| 19 | Alloy D and 405 S. S. | do | 43 | 100 |

S. S. = stainless steel.
N. F. = no failure.

The numerically designated stainless steels can be found in the AISI tables which contain numerical designations for American Iron and Steel Institute standard steels. Other alloys identified as alloys A, B, C and D are as follows:

Alloy A is an iron-chromium-molybdenum-manganese alloy sold under the trademark "Croloy" and contains approximately 2.25% chromium, 0.5% molybdenum, and the balance substantially all iron.

Alloy B is a nickel-molybdenum-chromium tungsten-iron alloy sold under the trademark "Hastelloy C" and contains approximately 17% molybdenum, 5% iron, 4% tungsten, 16.5% chromium, and the balance substantially all nickel.

Alloy C is a nickel-copper alloy sold under the trademark "Monel" and contains approximately 70% nickel and 30% copper.

Alloy D is a nickel-chromium-iron alloy sold under the trademark "Inconel" and contains approximately 16% chromium, 8% iron, and the balance substantially all nickel.

As will be noted from Table XI, the welds produced by the electrodes of this invention have high weld ductility and high soundness of weld, being also strong, free from porosity and hot cracking and otherwise of marked superiority.

EXAMPLES OF WELD OVERLAYS

In order to further demonstrate the relative ability of weld deposits produced by the electrodes of this invention to withstand hot weld cracking in spite of substantial dilution of the weld metal by iron, a number of restrained overlay tests were made with prior art electrodes as well as with electrodes in accordance with this invention. These tests which provide an unusually severe evaluation of the weld hot cracking resistance were executed on 6" x 6" x 1/2" mild steel plates restrained by being secured to larger, heavy steel mounting plates. A multipass overlay was then made on the restrained test plate by depositing weld beads with these electrodes and showed an average dilution by iron in the first weld bead layer of about 25%. After completion of the weld, the restrained plates were removed from the mounting plates and the beads of test metal were machined to expose some surface at varying depths below the bead surface. Each exposed surface was polished and etched in order to bring out any cracks and was then examined to determine the extent of cracking near the interface between the weld metal and the base plate metal, which is the point at which cracking is most likely to occur. The following Table XII is a summary of the crack test results obtained using various prior art electrodes as well as the electrode of the present invention:

*Table XII*

| Weld | Electrode | Cracking Near Interface |
| --- | --- | --- |
| 1 | Prior art | Extremely severe. |
| 2 | do | Slight. |
| 3 | do | Severe. |
| 4 | do | Moderate. |
| 5 | Present invention | Very slight. |
| 6 | do | None. |

Welds 5 and 6 were made with coated electrodes in accordance with this invention. Welds 1 to 4 were made using coated electrodes having compositions outside the scope of the invention and are included for comparison purposes.

The weld overlays identified as 1, 2, 3, 4, 5, and 6 were prepared by using electrodes identified as follows:

Weld 1 is an overlay made by an electrode having a core wire of a nickel-chromium-iron alloy sold under the trademark "Inconel" and contains approximately 15% chromium, 8% iron and the balance substantially all nickel. The core wire has no molybdenum and no columbium but does have about 0.25% manganese. The flux coating had some columbium and molybdenum since the weld metal composition contained approximately columbium (with or without tantalum) 0.42%, molybdenum 0.40%, silicon 0.27%, carbon 0.12%, sulfur 0.02% and with aluminum, titanium and magnesium practically nil.

Weld 2 is an overlay made by a coated electrode sold under the trademark "142." This electrode has an 80/20 core and is of the type described in Table 6 of U. S. Patent No. 2,445,951. This electrode requires a 500° F. baking treatment to produce radiographically sound welds. This treatment results in a somewhat friable coating.

Weld 3 is an overlay made by a coated electrode sold under the trademark "132" and has a core wire of columbium-modified "Inconel" containing approximately 15% chromium, 8% iron, 2% columbium, 0.35% silicon, 0.25% manganese, 0.25% titanium, 0.03% magnesium, 0.20% aluminum, and the balance substantially all nickel. The flux coating of this electrode contained 45.75% calcium carbonate, 28% cryolite, 10% calcium silicate, 3% ferro-manganese (85%), 10% ferro-columbium (50%), 0.25% lithium carbonate and 3% bentonite, the binder comprising 15% of a sodium silicate solution (42° Baumé) and 2.5% "Mordex." The weld metal deposited contained 37% iron, 0.3% silicon, 1.8% columbium, 0.09% carbon, 0.76% manganese and with molybdenum, titanium, aluminum and magnesium practically nil.

Weld 4 is an overlay made by a coated electrode having a core wire of "Inconel" containing approximately 15% Chromium, 8% iron, around 0.2% aluminum, and the balance substantially all nickel. The weld metal composition contained approximately 28% iron, 0.06% molybdenum, 0.76% columbium, 1% manganese, 0.06% carbon, and 0.28% silicon. From Tables VI, VII and X it is evident that weld 4 has a very much lower molybdenum content than that of a weld metal composition produced by using an electrode of this invention having substantially applicants' minimum molybdenum content. Accordingly, it will be appreciated that the flux coating of the electrode used in making weld 4 likewise must have had a much lower molybdenum content than the electrodes in accordance with this invention. Thus, from Table XII it is apparent that weld 4 produced by using an electrode containing too little molybdenum and an excessive amount of aluminum is inferior to weld 6 produced by an electrode in accordance with this invention.

Weld 5 is an overlay made by electrode "A" of Tables VI, VII, VIII and IX.

Weld 6 is an overlay made by electrode "B" of Tables VI, VII, VIII, and IX.

The foregoing test results of Table VII confirm the superior ability of weld deposits produced by the electrodes of this invention to withstand weld hot cracking, especially under restraint and in spite of substantial dilution by iron.

The presence of manganese, molybdenum and columbium in controlled amounts in the electrode together with a special control of aluminum in the core wire is important for the control of cracking near the interface of the weld. The importance of the control of aluminum is illustrated by a series of weld overlays made by the procedure outlined in connection with Table XII.

*Table XIII*

| Weld | Approximate Aluminum Content in Core Wire (Percent by Weight) | Cracking Near Interface |
| --- | --- | --- |
| 7 | 0.15 | Severe. |
| 8 | 0.09 | Moderate. |
| 9 | 0.06 | Do. |
| 10 | 0.03 | Slight. |
| 11 | 0.01 | Very Slight. |
| 12 | 0.005 | Do. |

The welds of Table XIII were made with an electrode having core wires comprising aluminum contents as shown in Table XIII and also containing approximately 16% chromium, 2% columbium, 0.4% manganese, 0.2% titanium, 0.08% magnesium, 0.07% carbon, 0.35% silicon and the balance substantially all nickel. The flux coating used in each of these electrodes was that of electrode A of Table VII.

The data of Table XIII demonstrate that, as the aluminum content decreases in the core wire of welding electrodes in accordance with this invention, weld hot cracking near the interface of a welded overlay, produced by these electrodes, decreases. This is also demonstrated by the data presented in Table XIV.

*Table XIV*

CORE WIRE AND WELD COMPOSITION

| Elements | Weld 13 | | Weld 14 | |
| --- | --- | --- | --- | --- |
| | Core Wire | Weld Metal | Core Wire | Weld Metal |
| Chromium | 16 | 12 | 16 | 12 |
| Iron | 8.18 | 32.93 | 8.18 | 32.83 |
| Manganese | 1.2 | 2 | 1.2 | 2.1 |
| Silicon | 0.48 | 0.29 | 0.53 | 0.33 |
| Carbon | 0.09 | 0.11 | 0.04 | 0.09 |
| Titanium | 0.021 | <0.01 | 0.18 | 0.017 |
| Aluminum | 0.054 | 0.014 | 0.17 | 0.045 |
| Magnesium | 0.036 | <0.01 | 0.03 | 0.01 |
| Columbium | 1.41 | 1.33 | 1.37 | 1.48 |
| Tantalum | 0.71 | 0.13 | 0.79 | 0.19 |
| Molybdenum | 2.16 | 1.59 | 2.05 | 1.37 |
| Nickel | balance | | balance | |
| Result of Weld | practically no cracking | | severe cracking | |

Weld overlays 13 and 14 of Table XIV were made with electrodes having core wire compositions as shown in Table XIV. The flux coating of these electrodes was that of electrode A of Table VII except that the ferro-molybdenum was omitted and approximately contains 40% calcium carbonate, 25% cryolite, 9.25% calcium silicate, 9% ferro-manganese (85% grade), 9% ferro-columbium (50% grade), 0.5% lithium carbonate, 4.25% chromium oxide and 3% bentonite.

Weld overlays 7 through 14 of Tables XIII and XIV show that by the control of the aluminum in the core wire in accordance with this invention the new arc welding electrodes of this invention have good arc behavior, good slagging characteristics and produce welds having satisfactory resistance to weld hot crackng.

It is to be observed that the present invention provides a unique, flux-coated arc-welding electrode, containing a nickel alloy core of special composition for producing improved, sound, ductile welds having substantial freedom from hot cracking together with an easily removable slag. In the present invention substantial benefits are obtained by combining in special electrodes a columbium, molybdenum and manganese content together with a controlled aluminum content in the core wire of the electrode and further by incorporating with the flux an effective addition of cryolite, calcium carbonate, calcium silicate and preferably lithium carbonate to provide an electrode which will produce satisfactory strong welds in joining or overlaying a variety of metals, especially in joining various dissimilar metals, and which will have improved arc stability and good slag characteristics and will deposit metal having good weld soundness and ductility and good freedom from hot cracking. Furthermore, in accordance with the invention, the special electrodes hereinbefore described contain controlled amounts of the essential metals columbium, molybdenum and manganese together with a controlled aluminum content in the core wire. These new electrodes reduce weld porosity and hot weld cracking tendencies and further incorporate sufficient calcium carbonate in the flux to keep the carbon content of the weld low. The flux also contains bentonite and a suitable binder material to produce a flux coating of high mechanical strength and a coating capable of rough handling without cracking and chipping.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A welding electrode having a core wire containing about 10% to about 25% chromium, up to about 20% iron and at least about 50% nickel and a flux coating upon the core wire, said flux coating containing by weight about 30% to about 50% calcium carbonate, about 15% to about 35% cryolite, about 5% to about 15% calcium silicate and a silicate type binder; said electrode containing columbium in an amount from about 1.5% to about 5% by weight of the electrode, molybdenum from about 0.5% to about 7% by weight of the electrode and manganese from about 0.75% to about 4% by weight of the electrode and being characterized by its adaptation for forming crack-free weld deposits in welding dissimilar metals.

2. A welding electrode having a core wire containing about 10% to about 25% chromium, up to about 20% iron, up to about 0.12% aluminum and at least about 50% nickel and a flux coating upon the core wire, said flux coating containing by weight about 30% to about 50% calcium carbonate, about 15% to about 35% cryolite, about 5% to about 15% calcium silicate and a silicate type binder; said electrode containing columbium in an amount from about 1.5% to about 5% by weight of the electrode, molybdenum from about 0.5% to about 7% by weight of the electrode and manganese from about 0.75% to about 4% by weight of the electrode and being characterized by its adaptation for forming crack-free weld deposits in welding dissimilar metals.

3. A welding electrode having a core wire containing about 10% to about 25% chromium, up to about 20% iron, up to about 0.5% titanium, up to about 0.12% aluminum, up to about 0.75% silicon, up to about 0.15% carbon, up to about 0.08% magnesium and at least about 50% nickel and a flux coating upon the core wire, said flux coating containing by weight about 30% to about 50% calcium carbonate, about 15% to about 35% cryolite, about 5% to about 15% calcium silicate, up to about 1% lithium carbonate, up to about 8% chromium oxide, up to about 5% bentonite and a silicate type binder; said electrode containing columbium in an amount from about 1.5% to about 5% by weight of the electrode, molybdenum from about 0.5% to about 7% by weight of the electrode and manganese from about 0.75% to about 4% by weight of the electrode and being characterized by its adaptation for forming crack-free weld deposits in welding dissimilar metals.

4. A welding electrode having a core wire containing about 14% to about 17% chromium, about 5% to about 10% iron and at least about 70% nickel and a flux coating upon the core wire, said flux coating containing by weight about 35% to about 45% calcium carbonate, about 20% to about 30% cryolite, about 6% to about 10% calcium silicate and a silicate type binder; said electrode containing columbium in an amount from about 1.5% to about 5% by weight of the electrode, molybdenum from about 0.5% to about 7% by weight of the electrode and manganese from about 0.75% to about 4% by weight of the electrode and being characterized by its adaptation for forming crack-free weld deposits in welding dissimilar metals.

5. A welding electrode having a core wire containing about 14% to about 17% chromium, about 5% to about 10% iron, up to about 0.12% aluminum and at least about 70% nickel and a flux coating upon the core wire, said flux coating containing by weight about 35% to about 45% calcium carbonate, about 20% to about 30% cryolite, about 6% to about 10% calcium silicate and a silicate type binder; said electrode containing columbium in an amount from about 1.5% to about 5% by weight of the electrode, molybdenum from about 0.5% to about 7% by weight of the electrode and manganese from about 0.75% to about 4% by weight of the electrode and being characterized by its adaptation for forming crack-free weld deposits in welding dissimilar metals.

6. A welding electrode having a core wire containing about 14% to about 17% chromium, about 5% to about 10% iron, up to about 0.12% aluminum, about 0.1% to about 0.35% titanium, about 0.02% to about 0.05% magnesium and at least about 7% nickel and a flux coating upon the core wire, said flux coating containing by weight about 35% to about 45% calcium carbonate, about 20% to about 30% cryolite, about 6% to about 10% calcium silicate, about 0.2% to about 1% lithium carbonate, about 3% to about 8% chromium oxide, about 2% to about 5% bentonite and a silicate type binder; said electrode containing columbium in an amount from about 1.5% to about 5% by weight of the electrode, molybdenum from about 0.5% to about 7% by weight of the electrode and manganese from about 0.75% to about 4% by weight of the electrode and being characterized by its adaptation for forming crack-free weld deposits in welding dissimilar metals.

7. A welding electrode having a core wire containing about 14% to about 17% chromium, about 5% to about 10% iron, up to about 0.08% aluminum, about 0.1% to about 0.35% titanium, about 0.02% to about 0.05% magnesium, up to about 0.25% silicon, up to about 0.1% carbon and at least about 70% nickel and a flux coating upon the core wire, said flux coating containing by weight about 35% to about 45% calcium carbonate, about 20% to about 30% cryolite, about 6% to about 10% calcium silicate, about 0.2% to about 1% lithium carbonate, about 3% to about 8% chromium oxide, about 2% to about 5% bentonite and a silicate type binder; said electrode containing columbium in an amount from about 1.5% to about 5% by weight of the electrode, molybdenum from about 0.5% to about 7% by weight of the electrode and manganese from about 0.75% to about 4% by weight of the electrode and being characterized by its adaptation for forming crack-free weld deposits in welding dissimilar metals.

8. A welding electrode having a core wire containing about 10% to about 25% chromium, up to about 20% iron and at least about 50% nickel and a flux coating upon the core wire, said flux coating containing by weight about 30% to about 50% calcium carbonate, about 15% to about 35% cryolite, about 5% to about 15% calcium silicate and a silicate type binder; said electrode containing columbium, molybdenum and manganese partly in the flux and partly in the core in amounts by weight of the coated electrode from about 1.5% to about 5% of columbium, from about 0.5% to about 7% of molybdenum and from about 0.75% to about 4% of manganese and said electrode being characterized by its adaptation for forming crack-free weld deposits in welding dissimilar metals.

9. A welding electrode having a core wire containing about 10% to about 25% chromium, up to about 20% iron, up to about 0.12% aluminum and at least about 50% nickel and a flux coating upon the core wire, said flux coating containing by weight about 30% to about 50% calcium carbonate, about 15% to about 35% cryolite, about 5% to about 15% calcium silicate and a silicate type binder; said electrode containing columbium, molybdenum and manganese partly in the flux and partly in the core in amounts by weight of the coated electrode from about 1.5% to about 5% of columbium, from about 0.5% to about 7% of molybdenum and from about 0.75% to about 4% of manganese and said electrode being characterized by its adaptation for forming crack-free weld deposits in welding dissimilar metals.

10. A welding electrode having a core wire containing about 10% to about 25% chromium, up to about 20% iron, up to about 0.5% titanium, up to about 0.12% aluminum, up to about 0.75% silicon, up to about 0.15% carbon, up to about 0.08% magnesium, up to about 5% molybdenum, up to about 4% columbium, up to about 4% manganese and at least about 50% nickel and a flux coating upon the core wire, said flux coating containing by weight about 30% to about 50% calcium carbonate, about 15% to about 35% cryolite, about 5% to about 15% calcium silicate, up to about 1% lithium carbonate, up to about 8% chromium oxide, up to about 5% bentonite, up to 15% molybdenum, up to 12% columbium, and up to 13% manganese and a silicate type binder; the columbium, molybdenum and manganese in the core wire and flux coating being so proportioned that said electrode contains columbium in an amount from about 1.5% to about 5% by weight of the electrode, molybdenum from about 0.5% to about 7% by weight of the electrode and manganese from about 0.75% to about 4% by weight of the electrode and said electrode is characterized by its adaptation for forming crack-free weld deposits in welding dissimilar metals.

11. A welding electrode having a core wire containing about 14% to about 17% chromium, about 5% to about 10% iron and at least about 70% nickel and a flux coating upon the core wire, said flux coating containing by weight about 35% to about 45% calcium carbonate, about 20% to about 30% cryolite, about 6% to about 10% calcium silicate and a silicate type binder; said electrode containing columbium, molybdenum and manganese partly in the flux and partly in the core in amounts by weight of the coated electrode from about 1.5% to about 5% of columbium, from about 0.5% to about 7% of molybdenum and from about 0.75% to about 4% of manganese and said electrode being characterized by its adaptation for forming crack-free weld deposits in welding dissimilar metals.

12. A welding electrode having a core wire containing about 14% to about 17% chromium, about 5% to about 10% iron, up to about 0.12% aluminum and at least about 70% nickel and a flux coating upon the core wire, said flux coating containing by weight about 35% to about 45% calcium carbonate, about 20% to about 30% cryolite, about 6% to about 10% calcium silicate and a silicate type binder; said electrode containing columbium, molybdenum and manganese partly in the flux and partly in the core in amounts by weight of the coated electrode from about 1.5% to about 5% of columbium, from about 0.5% to about 7% molybdenum and from about 0.75% to about 4% of manganese and said electrode being characterized by its adaptation for forming crack-free weld deposits in welding dissimilar metals.

13. A welding electrode having a core wire containing about 14% to about 17% chromium, about 5% to about 10% iron, up to about 0.08% aluminum, about 0.1% to about 0.35% titanium, about 0.02% to about 0.05% magnesium, up to about 0.25% silicon, up to about 0.1% carbon and at least about 70% nickel and a flux coating upon the core wire, said flux coating containing by weight about 35% to about 45% calcium carbonate, about 20% to about 30% cryolite, about 6% to about 10% calcium silicate, about 0.2% to about 1% lithium carbonate, about 3% to about 8% chromium oxide, about 2% to about 5% bentonite and a silicate type binder; said electrode containing columbium, molybdenum and manganese partly in the flux and partly in the core in amounts by weight of the coated electrode from about 1.5% to about 5% of columbium, from about 0.5% to about 7% of molybdenum and from about 0.75% to about 4% of manganese and said electrode being characterized by its adaptation for forming crack-free weld deposits in welding dissimilar metals.

14. A welding electrode having a core wire containing about 14% to about 17% chromium, about 5% to about 10% iron, about 0.1% to about 0.35% titanium, up to about 0.08% aluminum, up to about 0.25% silicon, up to about 0.1% carbon, about 0.02% to about 0.05% magnesium, up to about 3% molybdenum, about 1.5% to about 3% columbium, about 0.25% to about 3% maganese and at least about 70% nickel and a flux coating upon the core wire, said flux coating containing by weight about 35% to about 45% calcium carbonate, about 20% to about 30% cryolite, about 6% to about 10% calcium silicate, about 0.2% to about 1% lithium carbonate, about 2% to about 5% bentonite, about 2% to 6% molybdenum, about 2% to 6% columbium, and about 4 to 8% manganese and a silicate type binder, the columbium, molybdenum and manganese in the core wire and flux coating being so proportioned that said electrode contains columbium in an amount from about 1.5% to about 5% by weight of the electrode, molybdenum from about 0.5% to about 7% by weight of the electrode and manganese from about 0.75% to about 4% by weight of the electrode; said electrode being characterized by its adaptation for forming crack-free weld deposits in welding dissimilar metals.

15. A welding electrode having a core wire containing about 10% to about 25% chromium, up to about 20% iron, about 0.5% to about 5% molybdenum, about 2% to about 4% columbium, about 1% to about 4% manganese and at least about 50% nickel and a flux coating upon the core wire, said flux coating containing by weight about 30% to about 50% calcium carbonate, about 15% to about 35% cryolite, about 5% to about 15% calcium silicate, and a silicate type binder; said electrode being characterized by its adaptation for forming crack-free weld deposits in welding dissimilar metals.

16. A welding electrode having a core wire containing about 10% to about 25% chromium, up to about 20% iron, up to about 0.5% titanium, up to about 0.12% aluminum, up to about 0.75% silicon, up to about 0.15% carbon, up to about 0.08% magnesium, about 0.5% to about 5% molybdenum, about 2% to 4% columbium, about 1% to about 4% manganese and at least about 50% nickel and a flux coating upon the core wire, said flux coating containing by weight about 30% to about 50% calcium carbonate, about 15% to about 35% cryolite, about 5% to about 15% calcium silicate, up to about 1% lithium carbonate, up to about 5% bentonite, and a silicate type binder; said electrode being characterized by its adaptation for forming crack-free weld deposits in welding dissimilar metals.

17. A welding electrode having a core wire containing about 14% to 17% chromium, from about 5% up to about 10% iron, 0.1% to 0.35% titanium, up to 0.08% aluminum, up to 0.25% silicon, up to 0.1% carbon, 0.02% to 0.05% magnesium, about 0.5% to about 5% molybdenum, about 2% to about 4% columbium, about 1% to about 4% manganese and at least about 70% nickel and a flux coating upon the core wire, said flux coating containing by weight about 35% to about 45% calcium carbonate, about 20% to about 30% cryolite, about 6% to about 10% calcium silicate, up to about 1% lithium carbonate, up to about 5% bentonite, and a silicate type binder; said electrode being characterized by its adaptation for forming crack-free weld deposits in welding dissimilar metals.

18. A welding electrode having a core wire containing about 10% to about 25% chromium, up to about 20% iron, and at least about 50% nickel and a flux coating upon the core wire, said flux coating containing by weight about 30% to about 50% calcium carbonate, about 15% to about 35% cryolite, about 5% to about 15% calcium silicate, about 2.8% to about 15% molybdenum, about 7.5% to about 12 columbium, and about 5% to about 13% manganese and a silicate type binder, said electrode being characterized by its adaptation for forming crack-free weld deposits in welding dissimilar metals.

19. A welding electrode having a core wire containing about 10% to about 25% chromium, up to about 20% iron, up to about 0.5% titanium, up to about 0.12% aluminum, up to about 0.75% silicon, up to about 0.15% carbon, up to about 0.08% magnesium, and at least about 50% nickel and a flux coating upon the core wire, said flux coating containing by weight about 30% to about 50% calcium carbonate, about 15% to about 35% cryolite, about 5% to about 15% calcium silicate, up to about 1% lithium carbonate, up to about 5% bentonite, about 2.8% to about 15% molybdenum, about 7.5% to about 12% columbium, and about 5% to about 13% manganese and a silicate type binder, said electrode being characterized by its adaptation for forming crack-free weld deposits in welding dissimilar metals.

20. A welding electrode having a core wire containing about 14% to 17% chromium, from about 5% to about 10% iron, 0.1% to 0.35% titanium, up to about 0.08% aluminum, up to 0.25% silicon, up to 0.1% carbon, 0.02% to 0.05% magnesium, and at least about 70% nickel and a flux coating upon the core wire, said flux coating containing by weight about 35% to about 45% calcium carbonate, about 20% to about 30% cryolite, about 6% to about 10% calcium silicate, about 0.2% to 1% lithium carbonate, about 2% to 5% bentonite, about 2.8% to about 15% molybdenum, about 7.5% to about 12% columbium, and about 5% to about 13% manganese and a silicate type binder, said electrode being characterized by its adaptation for forming crack-free weld deposits in welding dissimilar metals.

References Cited in the file of this patent

UNITED STATES PATENTS

| | | |
|---|---|---|
| 2,024,992 | Wissler et al. | Dec. 17, 1935 |
| 2,520,806 | Kihlgren et al. | Aug. 29, 1950 |
| 2,576,123 | Kihlgren et al. | Nov. 27, 1951 |

UNITED STATES PATENT OFFICE
CERTIFICATE OF CORRECTION

Patent No. 2,798,824 July 9, 1957

Pierre E. Le Grand et al.

It is hereby certified that error appears in the printed specification of the above numbered patent requiring correction and that the said Letters Patent should read as corrected below.

Column 4, line 19, for "thees" read -- these --; column 8, line 14, for "Table VII" read -- Table XII --; column 10, line 57, for "7%" read -- 70% --.

Signed and sealed this 22nd day of October 1957.

(SEAL)
Attest:

KARL H. AXLINE
Attesting Officer

ROBERT C. WATSON
Commissioner of Patents